United States Patent [19]

Inoue et al.

[11] Patent Number: 4,574,748
[45] Date of Patent: Mar. 11, 1986

[54] AIR INTAKE DEVICE OF AN INTERNAL COMBUSTION ENGINE

[75] Inventors: Tokuta Inoue, Mishima; Kiyohiko Oishi, Susono; Takamitsu Okamoto, Susono; Keiso Takeda, Susono, all of Japan

[73] Assignee: Toyota Jidosha Kabushiki Kaisha, Toyota, Japan

[21] Appl. No.: 650,072

[22] Filed: Sep. 13, 1984

[30] Foreign Application Priority Data

Feb. 6, 1984 [JP] Japan .................. 59-18459

[51] Int. Cl.⁴ .................. F02B 27/00; F02M 7/00
[52] U.S. Cl. .................. 123/52 MB; 123/188 M
[58] Field of Search ........... 123/52 M, 52 MB, 180 M

[56] References Cited

U.S. PATENT DOCUMENTS

| 3,814,069 | 6/1974 | Croft et al. | 123/52 M |
| 4,231,329 | 11/1980 | Ishida | 123/52 MB |
| 4,457,272 | 7/1984 | Koga | 123/188 M |
| 4,462,349 | 7/1984 | Motosugi et al. | 123/188 M |
| 4,480,606 | 11/1984 | Kato et al. | 123/188 M |
| 4,485,775 | 12/1984 | Kanda et al. | 123/188 M |

FOREIGN PATENT DOCUMENTS 0891339 9/1953 Fed. Rep. of Germany ........ 123/52 MB
58-23224 2/1983 Japan.

Primary Examiner—Craig R. Feinberg
Attorney, Agent, or Firm—Kenyon & Kenyon

[57] ABSTRACT

An air intake device comprising a main air intake passage and an auxiliary air intake passage, in which the main air intake passage interconnects the air cleaner to the engine cylinders and the auxiliary air intake passage is connected to the air cleaner at one end thereof and to the main air intake passage at the other end thereof. The equivalent pipe lengths of the main air intake passage and the auxiliary air intake passage are almost the same. An air pulsation control valve actuated in response to the engine load and the engine speed is arranged in the other end of the auxiliary air intake passage. The engine has a helically-shaped intake port comprising a helical portion, an inlet passage portion, and a bypass passage branched off from the inlet passage portion and connected to the helix terminating portion of the helical portion. A flow path control valve actuated in response to the engine load is arranged in the bypass passage. The opening and closing operation of the air pulsation control valve is carried out when the flow path control valve is open.

30 Claims, 15 Drawing Figures (a)

(b)

(c)

(d)

AIR INTAKE DEVICE OF AN INTERNAL COMBUSTION ENGINE

BACKGROUND OF THE INVENTION

1. Field of the Invention

The present invention relates to an air intake device of an internal combustion engine.

2. Description of the Prior Art

In order to create a strong swirl motion in the combustion chamber of an engine when the engine is operating under a light load while preventing the volumetric efficiency from decreasing when the engine is operating under a heavy load at a high speed, an engine having a helically-shaped intake port is known, as disclosed in Japanese Unexamined Patent Publication No. 58-23224. This helically-shaped intake port comprises a helical portion formed around the intake valve, a substantially straight extending inlet passage portion tangentially connected to the helical portion, and a bypass passage branched off from the inlet passage portion and connected to the helix terminating portion of the helical portion. A flow path control valve is arranged in the bypass passage and opened when the amount of air fed into the engine cylinders becomes larger than a predetermined amount. In this engine, when the amount of air fed into the engine cylinders is small and thus the engine is operating under a light load, since the flow path control valve is closed, air is introduced into the helical portion from the inlet passage portion. As a result, the entirety of the air swirls in the helical portion and, thus, a strong swirl motion is created in the combustion chamber. Contrary to this, when the amount of air fed into the engine cylinders is large and, thus, since the engine is operating under a heavy load at a high speed, the flow path control valve is opened. As a result, since the cross-sectional area of the air flow path in the intake port is increased and, in addition, a large part of the air is fed into the engine cylinders via the bypass passage having a small flow resistance, it is possible to ameliorate the reduction of the volumetric efficiency. However, in this engine, when the engine is operating under a heavy load at a high speed, since a part of the air flows within the helical portion having a large flow resistance and, in addition, the flow path control valve provides a flow resistance for the air, it is difficult to obtain a satisfactory high volumetric efficiency.

SUMMARY OF THE INVENTION

An object of the present invention is to provide an internal combustion engine capable of increasing the volumetric efficiency of an engine when the engine is operating under a heavy load at a high speed, while maintaining the creation of a strong swirl motion when the engine is operating under a light load.

According to the present invention, there is provided an air intake device of an internal combustion engine having an air cleaner, a cylinder head, a combustion chamber and an intake valve, the device comprising: a main air intake passage interconnecting the air cleaner to the combustion chamber; an auxiliary air intake passage having a first end and a second end which are connected to the air cleaner and the main air intake passage, respectively, wherein the auxiliary air intake passage has an equivalent pipe length substantially equal to that of the main air intake passage; an air pulsation control valve arranged in the second end of the auxiliary air intake passage; first actuating means for actuating the air pulsation control valve in response to an engine load to selectively open or close the air pulsation control valve in response to an engine speed when the engine load exceeds a predetermined first load, wherein the air pulsation control valve is open when the engine speed is within a predetermined first speed range and closed when the engine speed is within a predetermined second range; an intake port formed in the cylinder head and forming a part of the main air intake passage, this intake port having a helical portion which is formed around the intake valve and a helix terminating portion, an inlet passage portion tangentially connected to the helical portion, and a bypass passage branched off from the inlet passage portion and connected to the helical portion at the helix terminating portion; a flow path control valve arranged in the bypass passage; and second actuating means for actuating the flow path control valve in response to the engine load to open the flow path control valve when the engine load exceeds a predetermined second load not larger than the predetermined first load and close the flow path control valve when the engine load is lower than the predetermined second load.

The present invention may be more fully understood from the description of preferred embodiments of the invention set forth below, together with the accompanying drawings.

BRIEF DESCRIPTION OF THE DRAWINGS

In the drawings:

FIG. 12 is an overall view of an embodiment of the air intake device as applied to a diesel engine.

DESCRIPTION OF THE PREFERRED EMBODIMENTS

Figure 1:
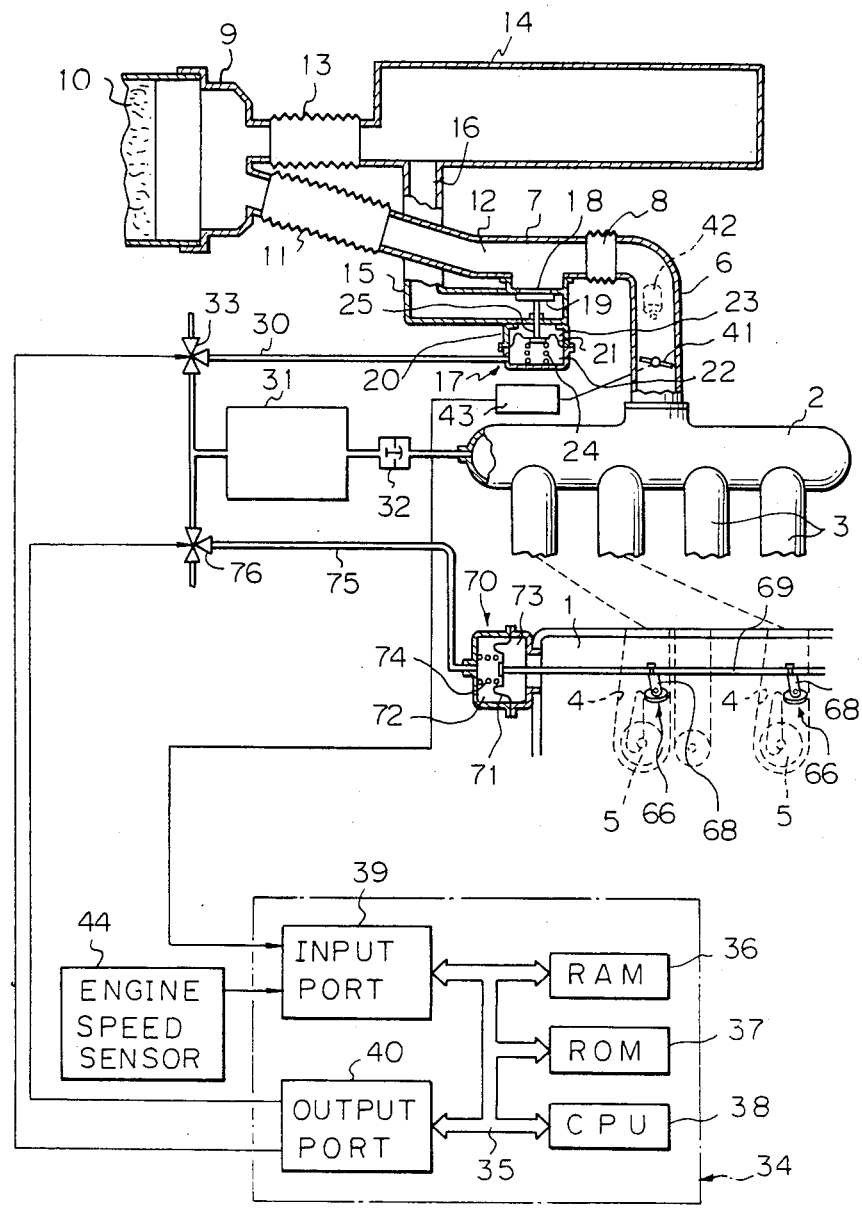
FIG. 1 is an overall view of an embodiment of an air intake device according to the present invention.

Referring to FIG. 1, reference numeral 1 designates an engine body, 2 an intake manifold, 3 branches of the intake manifold 2, and 4 intake ports formed in the engine body 1; 5 designates intake valves, 6 an air duct mounted on the intake manifold 2, 7 a main air intake pipe, and 8 a flexible hose interconnecting the main air intake pipe 7 and the air duct 6; 9 designates an air cleaner, 10 a filter element, and 11 a flexible hose interconnecting the air cleaner 9 and the main air intake pipe 7. The flexible hose 11, the main air intake pipe 7, the flexible hose 8, the air duct 6, the intake manifold 2, the manifold branches 3, and the intake ports 4, form a main air intake passage 12 interconnecting the air cleaner 9 to the engine cylinders. The air cleaner 9 is connected via a flexible hose 13 to a tank 14 having a fixed volumetric area, and the tank 14 is connected to the main air intake pipe 7 via a connecting pipe 15. The flexible hose 13, the tank 14, and the connecting pipe 15, form an auxiliary air intake passage 16. An air pulsation control valve 17 controlling the opening and closing operation of the auxiliary air intake passage 16 is arranged in the end of the connecting pipe 15. The air pulsation control valve 17 comprises a valve port 18 formed in the auxiliary air intake passage 16, a valve body 19 controlling the opening and closing operation of the valve port 18, and an actuator 20 actuating the valve body 19. The actuator 20 comprises a vacuum chamber 22 and an atmospheric pressure chamber 23, which are separated by a diaphragm 21. A compression spring 24 for biasing the diaphragm is inserted in the vacuum chamber 22, and the diaphragm 21 is connected to the valve body 19 via a valve rod 25.

As illustrated in FIG. 1, the vacuum chamber 22 of the actuator 20 is connected to a vacuum tank 31 via a conduit 30, and the vacuum tank 31 is connected to the intake manifold 2 via a check valve 32 which permits only the air flow from the vacuum tank 31 towards the intake manifold 2. A first solenoid valve 33 which is able to be open to the atmosphere is inserted into the conduit 30, and the solenoid of the valve 33 is connected to an electronic control unit 34. The electronic control unit 34 is constructed by a digital computer and comprises a RAM (random access memory) 36, a ROM (read only memory) 37, a CPU (microprocessor) 38, an input port 39, and a output port 40, which are connected to each other by a bidirectional bus 35. The output port 40 is connected to the solenoid of the first solenoid valve 33. A throttle valve 41 is inserted into the air duct 6, and a fuel injector 42 for injecting fuel toward the throttle valve 41 is arranged on the inner wall of the air duct 6 upstream of the throttle valve 41. A throttle switch 43 is attached to the throttle valve 41. This throttle switch 43 detects when the degree of opening of the throttle valve 41 exceeds a predetermined opening degree, for example, 50 degrees. The throttle switch 43 is connected to the input port 39. In addition, an engine speed sensor 44 producing a number of pulses proportional to the engine speed, is connected to the input port 39.

Next, the partial construction of the engine 1 will be described with reference to FIGS. 2 through 5.

Figure 2:
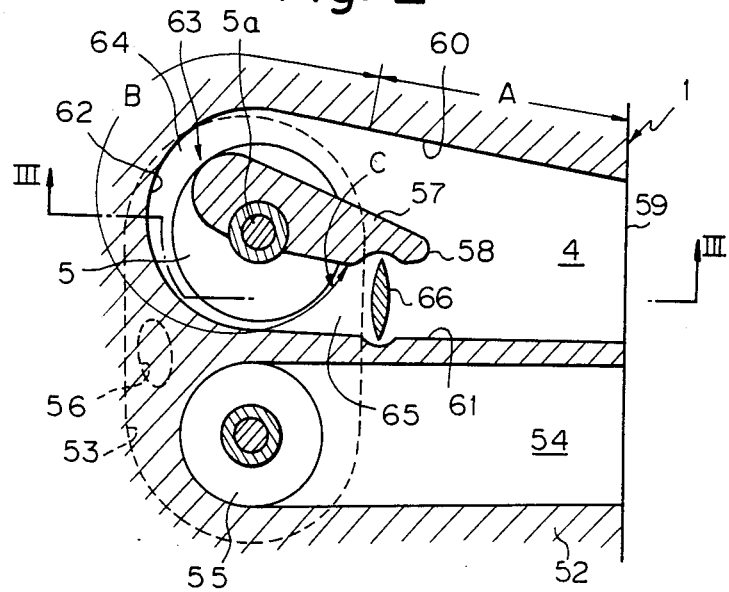
FIG. 2 is a cross-sectional plan view of a cylinder head.
Figure 3:
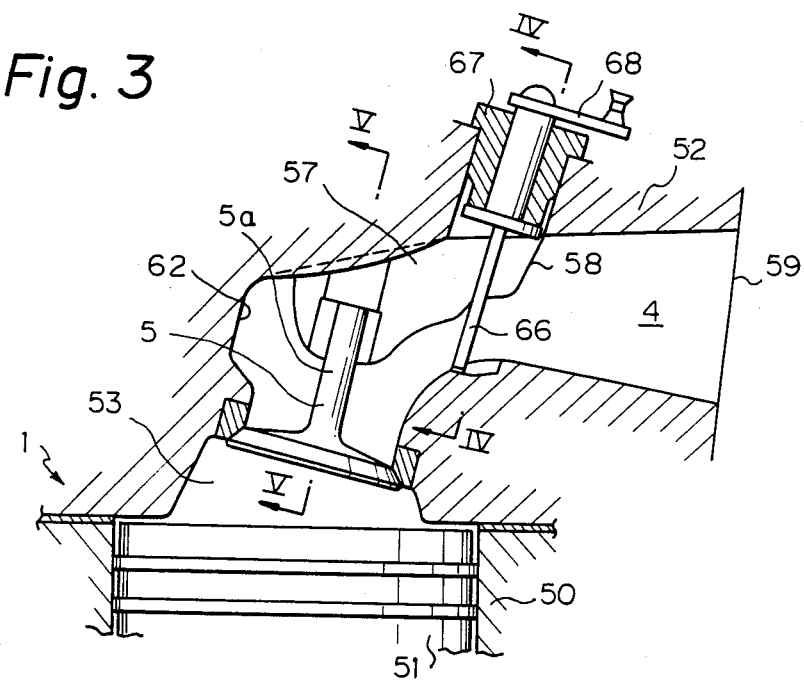
FIG. 3 is a cross-sectional side view of the cylinder head, taken along the line III—III in FIG. 2.
Figure 4:
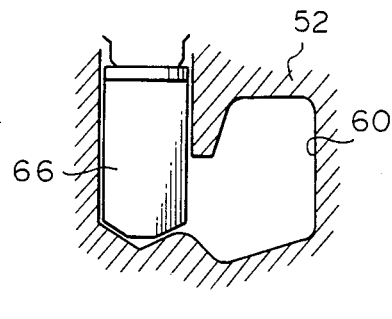
FIG. 4 is a cross-sectional view of the cylinder head, taken along the line IV—IV in FIG. 3.
Figure 5:
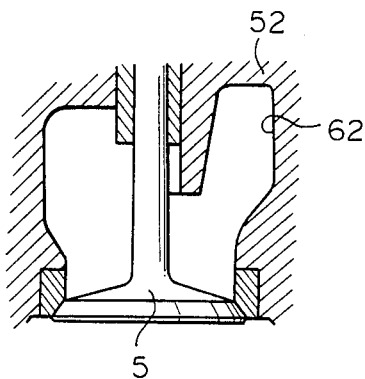
FIG. 5 is a cross-sectional view of the cylinder head, taken along the line V—V in FIG. 3.

Referring to FIGS. 2 and 3, reference numeral 50 designates a cylinder block, 51 a piston reciprocally movable in the cylinder block 50, 52 a cylinder head fixed onto the cylinder block 50, and 53 a combustion chamber; 54 designates an exhaust port, 55 an exhaust valve, and 56 a spark plug. A downward extending separating wall 57 is integrally formed on the upper wall of the intake port 4 and extends from the upper wall of the intake port 4 to a point halfway between the upper wall and the lower wall of the intake port 4. In addition, as can be seen from FIG. 2, the upstream end 58 of the separating wall 57 is approximately centrally located between the intake valve 5 and the inlet opening 59 of the intake port 4 and also approximately centrally located between the opposing side walls 60 and 61 of the intake port 4. The separating wall 57 extends beyond the valve stem 5a of the intake valve 5 to a position downstream of the valve stem 5a from the upstream end 58. A helical portion B and an inlet passage portion A tangentially connected to the helical portion B are formed in the intake port 4 by the separating wall 57, and the side wall 60 of the inlet passage portion A is smoothly connected to the circumferential wall 62 of the helical portion B, which has a semicylindrical shape. The downstream end 63 of the separating wall 57 is located near the circumferential wall 62 of the helical portion B, and a narrow passage portion 64 is formed between the downstream end 63 of the separating wall 57 and the circumferential wall 62 of the helical portion B. Consequently, the distance between the side wall 60 of the inlet passage portion A and the separating wall 57 becomes gradually short towards the narrow passage portion 64 from the inlet passage portion A. A bypass passage 65 branched off from the inlet passage portion A and connected to the helix terminating portion C of the helical portion B is formed in the intake port 4. This bypass passage 65 is formed between the separating wall 57 and the side wall 61 of the intake port 4 and extends straight towards the helix terminating portion C from the inlet passage portion A. A flow path control valve 66 is arranged in the bypass passage 65 and is rotatably supported by a valve holder 67 fixed onto the cylinder head 52. As can be seen from FIG. 3, the upper end of the flow path control valve 66 projects upward from the valve holder 67, and an arm 68 is fixed onto the projecting upper end of the flow path control valve 66. As illustrated in FIG. 1, the arms 68 of the flow path control valves 66 are connected to a diaphragm 71 of an actuator 70 via a common connecting rod 69. The actuator 70 comprises a vacuum chamber 72 and an atmospheric pressure chamber 73 which are separated by the diaphragm 71. A compression spring 74 for biasing the diaphragm 71 is inserted into the vacuum chamber 72. The vacuum chamber 72 is connected to the vacuum tank 31 via a conduit 75, and a second solenoid valve 76 which is able to be open to the atmosphere is arranged in the conduit 75. This second solenoid valve 76 is connected to the output port 40 of the electronic control unit 34.

When vacuum acts on the vacuum chamber 72 of the actuator 70, the diaphragm 71 moves towards the vacuum chamber 72 against the compression spring 74. As a result, the flow path control valve 66 rotates and, as illustrated in FIGS. 2 and 3, the flow path control valve 66 closes the bypass passage 65. At this time, air flows towards the helical portion B from the inlet passage portion A. This air flow is gradually speeded up as it moves forward from the inlet passage portion A towards the narrow passage portion 64. Then, since the air thus speeded up is caused to swirl along the circumferential wall 62 of the helical portion B, a strong swirl motion is created in the combustion chamber 53.

When the atmospheric pressure acts on the vacuum chamber 72 of the actuator 70 in FIG. 1, the diaphragm 71 moves towards the atmospheric pressure chamber 73 due to the spring force of the compression spring 74. As a result, as shown in FIGS. 2 and 3, the flow path control valve 66 rotates and opens the bypass passage 65 to a maximum extent. At this time, a part of the air flows into the helical portion B through the bypass passage 65. This part of the air comes into head-on collision with the air which flows, while swirling, along the circumferential wall 62 of the helical portion B and, as a result, the swirl motion is weakened. When the flow path control valve 66 opens the bypass passage 65 to a maximum extent, the cross-sectional area of the air flow path in the intake port 4 is increased, and a part of air flows within the substantially straight extending bypass passage 65 having a small flow resistance. In addition, at this time, the swirl motion is weakened by air flowing out from the bypass passage 65, as mentioned above. Consequently, the volumetric efficiency is increased.

Next, the operation of the auxiliary air intake passage 16 will be described with reference to FIG. 7. This auxiliary air intake passage 16 is provided for increasing the volumetric efficiency by using the air pulsation. Consequently, initially, the general nature of air pulsation will be described.

In an internal combustion engine, when the intake valve closes, since the air stream flowing within the air intake passage is abruptly stopped by the intake valve, a positive pressure is generated in the intake port located behind the rear face of the intake valve. When such a positive pressure is generated in the intake port, the air located in the intake port flows toward the open end of the air intake passage. As a result, the pressure in the intake port is reduced and a vacuum is produced in the intake port. When a vacuum is produced in the intake port, the air flows toward the intake port and a positive pressure is generated again in the intake port. Consequently, when the engine is operating, a positive pressure and a vacuum are alternately produced in the intake port and a so-called air pulsation is generated. Where such an air pulsation is generated, if the time interval of the opening operation of the intake valve becomes equal to the time period of the air pulsation, a standing wave having a node at the open end of the air intake passage is generated in the air intake passage. If such a standing wave is generated when the intake valve opens, a positive pressure is generated in the intake port and volumetric efficiency is improved. If the time interval of the opening operation of the intake valve becomes equal to the time period of the air pulsation when the engine speed is low, a fundamental standing wave is generated and, if the time interval of the opening operation of the intake valve becomes equal to the time period of the air pulsation when the engine speed is high, a second harmonic standing wave is generated. Consequently, in an engine, a standing wave is generated at a particular engine speed and, at this time, volumetric efficiency is increased.

The engine speed at which such a standing wave is generated depends on the length of the air intake passage. Normally, the generation of the standing wave is discussed by regarding the air intake passage as a straight pipe having a function regarding the generation of the standing wave, which function is the same as that of the air intake passage, and the length of the straight pipe is normally called an equivalent pipe length. An ordinary engine has a fixed equivalent pipe length. Consequently, in such an ordinary engine, the volumetric efficiency is improved at a particular engine speed, but it is impossible to improve the volumetric efficiency over the entire region of the engine speed. However, in such an ordinary engine, if the equivalent pipe length is changed in accordance with a change in the engine speed, it is possible to increase the volumetric efficiency over the entire region of the engine speed, due to the air pulsation.

Figure 7:
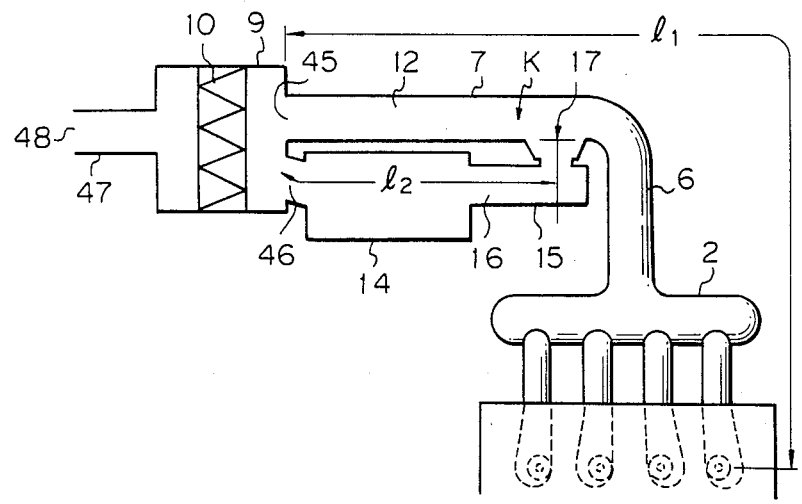
FIG. 7 is a schematic view of the air intake device shown in FIG. 1.

Referring to FIG. 7, the main air intake passage 12 and the auxiliary air intake passage 16 have a complicated flow path. However, the main air intake passage 12 and the auxiliary air intake passage 16 are formed so that, when they are regarded as a straight pipe which is equivalent with respect to the occurrence of the air pulsation, the equivalent pipe length $l_1$ of the main air intake passage 12 becomes equal to the equivalent pipe length $l_2$ of the auxiliary air intake passage 16. In order to equalize the equivalent pipe lengths $l_1$ and $l_2$, it is necessary to form the main air intake passage 12 and the auxiliary air intake passage 16 so that, essentially, they have almost the same length. However, even if the auxiliary air intake passage 16 has a length which is shorter than that of the main air intake passage 12; it is possible to equalize the equivalent pipe lengths $l_1$ and $l_2$ by arranging the tank 14 in the auxiliary air intake passage 16.

When the air pulsation control valve 17 closes, the construction of the air intake passage is such that the auxiliary air intake passage 16, which has a closed end and an equivalent pipe length the same as that of the main air intake passage 12, is connected to the air cleaner 9. When the air intake passage has such a construction, since the pressure produced by the air pulsation at the open end 45 of the main air intake passage 12, which is open to the air cleaner 9, and the pressure produced by the air pulsation at the open end 46 of the auxiliary air intake passage 16, which is also open to the air cleaner 9, cancel each other out, the operative function of the open end 45 of the main air intake passage 12 is the same as that of the end of the straight pipe open to the atmosphere, which pipe is equivalent to the main air intake passage 12. That is, since the main air intake passage 12 is open to the atmosphere via the air nose 47 of the air cleaner 9, the open end 48 of the air nose 47 forms the end open to the atmosphere. However, by connecting the auxiliary air intake passage 16 having a closed end to the air cleaner 9, the open end 45 of the main air intake passage 12 forms the end open to the atmosphere. Consequently, the open end 45 of the main air intake passage 12 functions as the end open to the atmosphere independently of the constructions of the air cleaner 9 and the air nose 47. This means that it is possible to freely determine the constructions of the air cleaner 9 and the air nose 47.

When the air pulsation control valve 17 closes, the open end 45 of the main air intake passage 12 functions as the end open to the atmosphere, as mentioned above. Consequently, at this time, the fundamental standing wave and the second harmonic standing wave, which are determined by the equivalent pipe length $l_1$, are generated at particular engine speeds.

Figure 8:
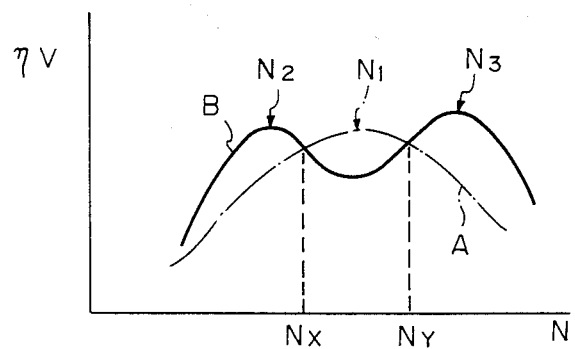
FIG. 8 is a diagram of the volumetric efficiency.

FIG. 8 illustrates the relationship between the volumetric efficiency $\eta v$ and the engine speed N. In FIG. 8, the curved line A indicates where the air pulsation control valve 17 is closed, and the curved line B indicates where the air pulsation control valve 17 is open. Where the air pulsation control valve 17 is closed, and when the engine speed becomes equal to $N_1$, the second harmonic standing wave is generated. Consequently, when the engine speed is equal to $N_1$, the volumetric efficiency $\eta v$ is increased, as illustrated in FIG. 8.

When the air pulsation control valve 17 is open, the position having an operative function the same as that of the end open to the atmosphere is changed. That is, when the air pulsation control valve 17 is open, the pressure wave produced by the closing action of the intake valve 5 propagated, on one hand, toward the air cleaner 9 through the main air intake passage 12 and, on the other hand, toward the air cleaner 9 through the auxiliary air intake passage 16 after passing through the air pulsation control valve 17. At this time, since a phase difference occurs between the phase of the air pulsation at the open end 45 of the main air intake passage 12 and the phase of the air pulsation at the open end 46 of the auxiliary air intake passage 16, the open end 45 of the main air intake passage 12 no longer functions as the end open to the atmosphere. Thus, as can be clearly understood, the position functioning as the end open to the atmosphere is changed to a position near the position K illustrated in FIG. 7. As a result, the equivalent pipe length of the main air intake passage 12 becomes short and, as illustrated by the curved line B in FIG. 8, when the engine speed N becomes equal to $N_2$ and $N_3$, the volumetric efficiency $\eta v$ is increased. The increase in the volumetric efficiency $\eta v$ at the engine speed $N_2$ is caused by the occurrence of the fundamental standing wave, and the increase in the volumetric efficiency $\eta v$ at the engine speed $N_3$ is caused by the occurrence of the second harmonic standing wave. Consequently, from FIG. 8, it will be understood that, if the air pulsation control valve 17 is caused to open when the engine speed N is lower than Nx and higher than Ny, and if the air pulsation control valve 17 is caused to close when the engine speed N is between Nx and Ny, it is possible to obtain a high volumetric efficiency independently of the engine speed N.

Next, the operation of the air intake device according to the present invention will be described with reference to FIGS. 1, 2, 3 and 4.

Figure 9:
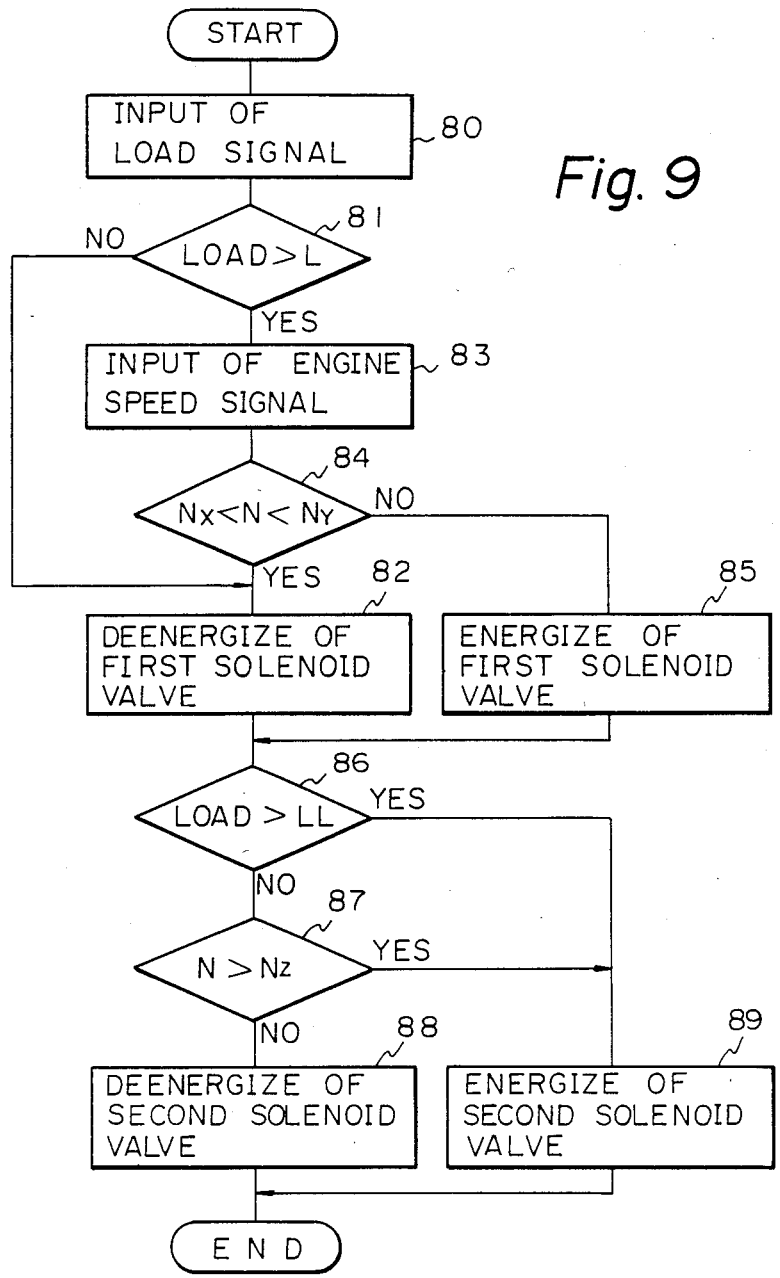
FIG. 9 is a flow chart of the control operation of the flow path control valve and the air pulsation control valve.

In FIG. 9, initially in step 80, the output signal of the throttle switch 43 is input into the CPU 38. This throttle switch 43 produces an output signal indicating that the degree of opening of the throttle valve 41 exceeds 50 degrees.

The degree of opening of the throttle valve 41 corresponds approximately to the engine load, and the output signal of the throttle switch 43 indicates approximately that the engine load exceeds a predetermined load. In step 81, it is determined whether the degree of opening of the throttle valve 41 exceeds 50 degrees, that is, the engine load exceeds a predetermined load L. If the engine load is lower than the predetermined load L, the routine jumps to step 82, and the solenoid of the first solenoid valve 33 is deenergized. When the solenoid of the first solenoid valve 33 is deenergized, the vacuum chamber 22 of the actuator 20 is caused to be open to the atmosphere. As a result, since the diaphragm 21 moves toward the atmospheric pressure chamber 23 due to the spring force of the compression spring 24, the valve body 19 closes the valve port 18. Contrary to this, when the engine load exceeds the predetermined load L, the routine goes to step 83. In step 83, the output signal of the engine speed sensor 44 is input into the CPU 38, and then, in step 84, it is determined whether the engine speed N is between Nx and Ny, as illustrated in FIG. 8. If the engine speed N is between Nx and Ny, the routine goes to step 82. In step 82, the solenoid of the first solenoid valve 33 is deenergized and the valve body 19 closes the valve port 18. Consequently, at this time, a high volumetric efficiency $\eta v$ is obtained, as illustrated by the curved line A in FIG. 8. When the engine speed N is lower than Nx or higher than Ny, the routine goes to step 85, and the solenoid of the first solenoid valve 33 is energized. At this time, the vacuum chamber 22 of the actuator 20 is connected to the vacuum tank 31. As a result, since the diaphragm 21 moves toward the vacuum chamber 22 against the compression spring 24, the valve body 19 opens the valve port 18. Consequently, at this time, the volumetric efficiency $\eta v$ is increased, as illustrated by the curved line B in FIG. 8.

Then, in step 86, it is determined whether the engine load exceeds a predetermined load LL. In this embodiment, the predetermined load LL is determined so that it is equal to the predetermined load L in step 81. When the engine load is lower than the predetermined load LL, the routine goes to step 87, and it is determined whether the engine speed N exceeds a predetermined speed Nz. When the engine speed N is lower than the predetermined speed Nz, the routine goes to step 88, and the solenoid of the second solenoid valve 76 is deenergized. At this time, the vacuum chamber 72 of the actuator 70 is connected to the vacuum tank 31 and, as a result, the flow path control valve 66 closes the bypass passage 65 as mentioned previously.

When it is determined, in step 86, that the engine load exceeds the predetermined load LL, or when it is determined, in step 87, that the engine speed N exceeds the predetermined speed Nz, the routine goes to step 89, and the solenoid of the second solenoid valve 76 is energized. At this time, the vacuum chamber 72 of the actuator 70 is caused to be open to the atmosphere and, as a result, the flow path control valve 66 opens the bypass passage 65 to a maximum extent, as mentioned previously.

Figure 6:
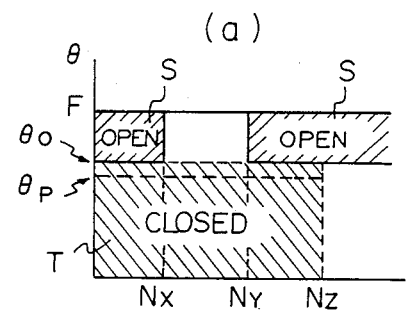
FIGS. 6(a)–(d) are diagrams indicating the open region and the closed region of the flow path control valve and the air pulsation control valve.
Figure 6:
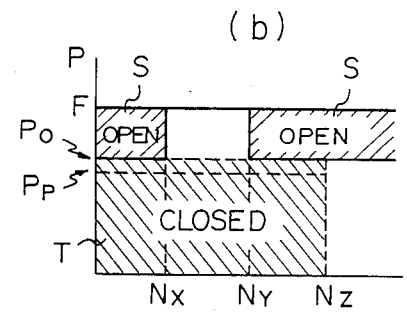
Figure 6:
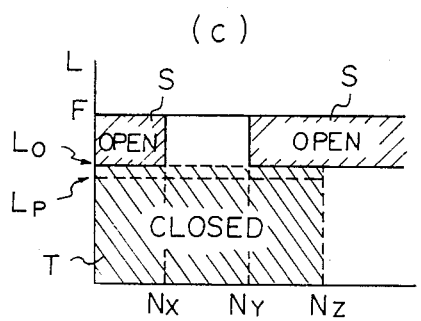
Figure 6:
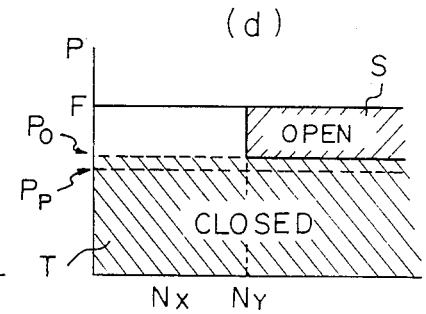

FIG. 6(a) illustrates the open region and the closed region of the air pulsation control valve 17 and the flow path control valve 66, which are controlled based on the flow chart illustrated in FIG. 9. In FIG. 6(a), the ordinate $\theta$ indicates the degree of opening of the throttle valve 41, and the abscissa N indicates the engine speed. In addition, in the ordinate, F indicates a wide open throttle, and $\theta_0$ indicates 50 degrees. This degree of opening $\theta_0$ of the throttle valve 41 corresponds to the predetermined load L in step 81 of FIG. 9 and to the predetermined load LL in step 86 of FIG. 9. Consequently, the air pulsation control valve 17 is open in the region illustrated by the hatching S in FIG. 6(a) and is closed in the other region. In addition, the flow path control valve 66 is closed in the region illustrated by the hatching T in FIG. 6(a) and is open in the other region. As illustrated in FIG. 6(a), when the degree of opening of the throttle valve 41 exceeds 50 degrees, that is, when the engine load exceeds the predetermined load L and LL, the flow path control valve 66 is open and, at this time, if the engine speed N is lower than Nx or higher than Ny, the air pulsation control valve 17 is open.

As mentioned previously, if the air pulsation control valve 17 is open when the engine speed N is lower than Nx or higher than Ny, the volumetric efficiency is increased due to the air pulsation. However, at this time, if the flow path control valve 66 is closed, it is impossible to sufficiently increase the volumetric efficiency even if the volumetric efficiency is increased due to the air pulsation. Consequently, as illustrated in FIG. 6(a), the flow path control valve 66 is controlled so that it opens when the degree of opening of the throttle valve 41 exceeds 50 degrees. As will be understood from the above description, if the flow path control valve 66 is open when the air pulsation control valve 17 opens, the volumetric efficiency can be increased. Consequently, it is possible to determine the predetermined loads L and LL so that the predetermined load LL at which the flow path control valve 66 opens is lower than the predetermined load L at which the air pulsation control valve 17 opens. In this case, the flow path control valve 66 opens when the degree of opening of the throttle valve 41 exceeds $\theta_p$ in FIG. 6(a). In addition, as illustrated in FIG. 6(a), when the degree of opening of the throttle valve 41 is smaller than 50 degrees, the air pulsation control valve 17 is caused to close. However, at this time, instead of being closed, the air pulsation control valve 17 may be caused to open. That is, when the degree of opening of the throttle valve 41 is small, since the air pulsation is suppressed by the throttle valve 41, an increase in the volumetric efficiency, which is caused by the air pulsation, is not expected. Consequently, when the degree of opening of the throttle valve 41 is smaller than 50 degrees, the volumetric efficiency is the same, irrespective of whether the air pulsation control valve 17 is open or closed.

Vacuum in the intake manifold 2 approximately indicates the engine load. Consequently, the air pulsation control valve 17 and the flow path control valve 66 may be controlled by the output signal of a vacuum switch 90 connected to the input port 39 and mounted on the intake manifold 2, as illustrated by the broken line in FIG. 1. FIG. 6(b), illustrates where the air pulsation control valve 17 and the flow path control valve 66 are controlled by the output signal of the vacuum switch 90. In FIG. 6(b), the ordinate P indicates absolute pressure in the intake manifold 2, and the abscissa N indicates engine speed. In addition, F indicates atmospheric pressure, and $P_0$ indicates 660 mmHgabs. Here, when the absolute pressure P in the intake manifold 2 exceeds 660 mmHgabs, the flow path control valve 66 is caused to open and, at this time, if the engine speed N becomes lower than Nx or higher than Ny, the air pulsation control valve 17 is caused to open.

FIGS. 6(c) and 12 illustrate the present invention as applied to a diesel engine. Here, the throttle valve 41 and the fuel injector 42 illustrated in FIG. 1 are removed in FIG. 12, and fuel injectors (not shown) are arranged in the engine cylinders. In addition, as illustrated in FIG. 12, a switch 91 actuated in response to the depressing operation of an accelerator pedal 92 is provided, and the air pulsation control valve 17 and the flow path control valve 66 are controlled by the output signal of the switch 91. In FIG. 6(c), the ordinate L indicates the depression of the accelerator pedal 92, and the abscissa N indicates engine speed. In addition, in the ordinate L, F indicates the maximum depression of the accelerator pedal 92, and $L_0$ indicates a predetermined depression thereof. Where the present invention is applied to a diesel engine, when the depression of the accelerator pedal 92 exceeds the predetermined depression $L_0$, the flow path control valve 66 is caused to open, as illustrated in FIG. 6(b) and, at this time, if the engine speed N is lower than Nx or higher than Ny, the air pulsation control valve 17 is caused to open. In addition, the flow path control valve 66 may be controlled so that, in FIG. 6(b), it opens or is closed at a predetermined absolute pressure $P_p$ which is lower than $P_0$. Furthermore, the flow path control valve 66 may be controlled so that, in FIG. 6(c), it opens or is closed at a predetermined depression $L_p$ which is lower than $L_0$.

Figure 10:
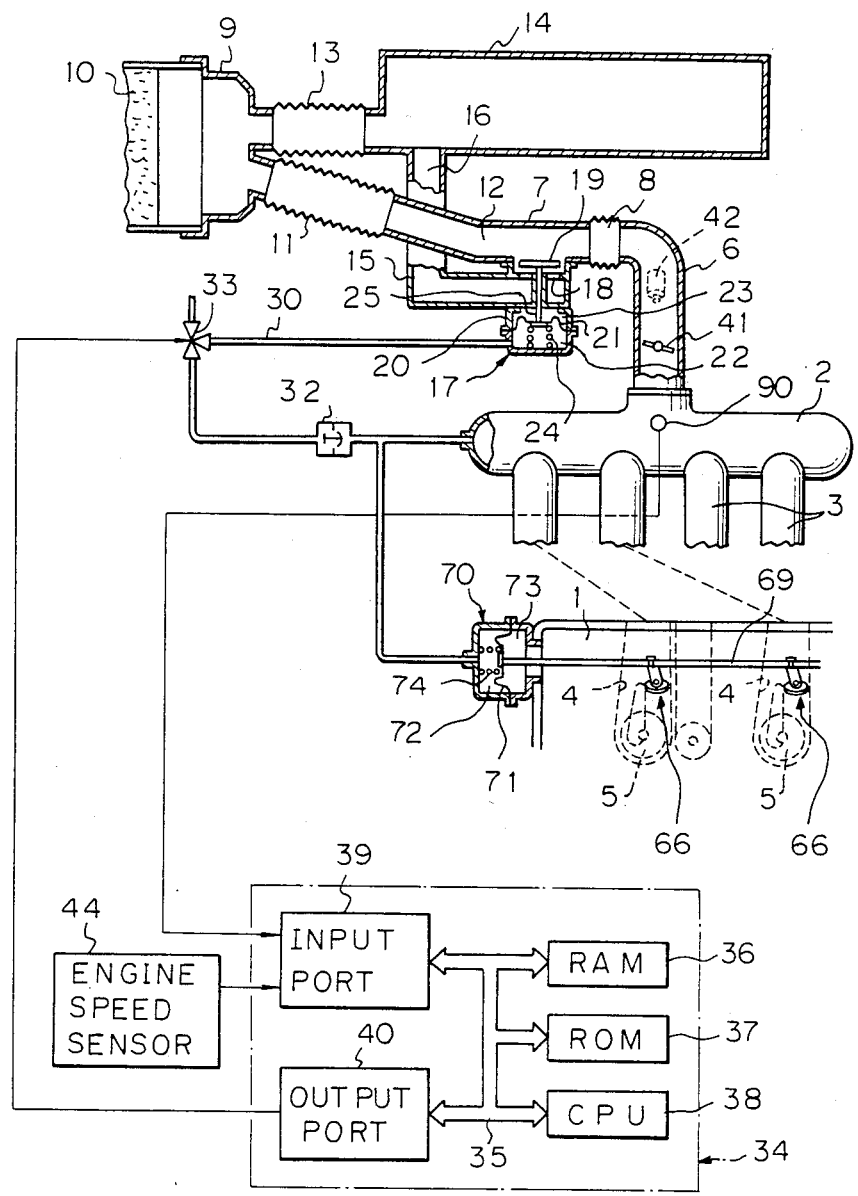
FIG. 10 is an overall view of an alternative embodiment of an air intake device according to the present invention.
Figure 11:
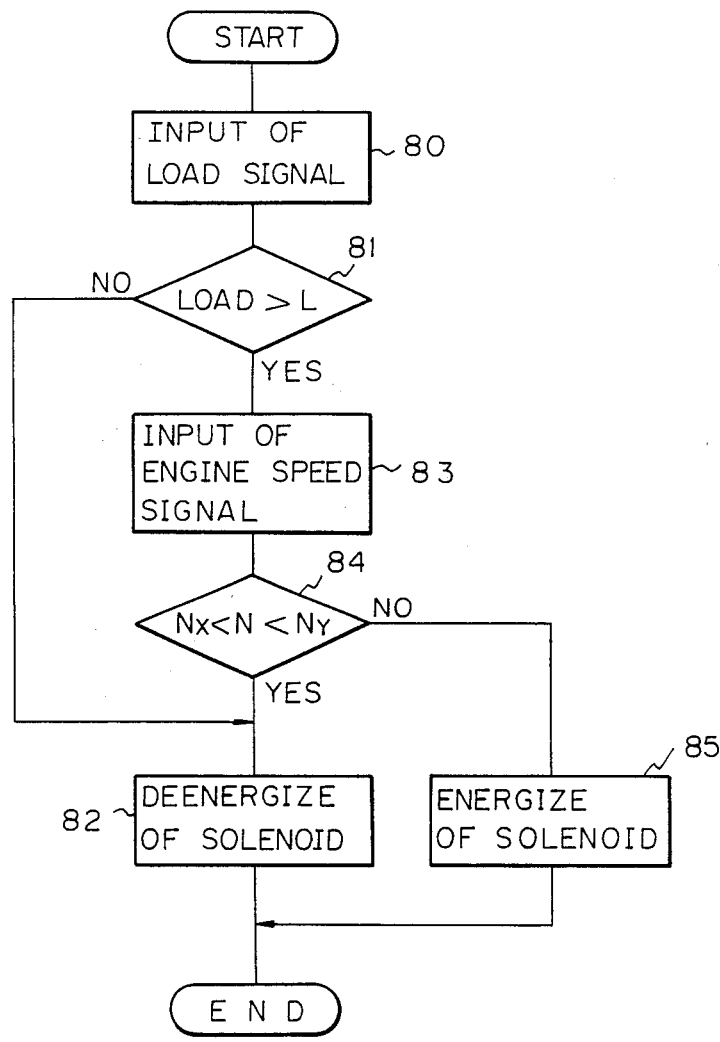
FIG. 11 is a flow chart of the control operation of the air pulsation control valve.

FIG. 10 illustrates an alternative embodiment. In this embodiment, the vacuum tank 31 illustrated in FIG. 1 is removed, and the vacuum chamber 72 of the actuator 70 is directly connected to the intake manifold 2. FIG. 11 illustrates a flow chart indicating the control of the solenoid valve 33. This control is the same as the control carried out in steps 80 through 85 of FIG. 9 and, therefore, the detailed description regarding FIG. 11 is omitted. In this embodiment, when the solenoid of the solenoid valve 33 is deenergized in step 82 of FIG. 11, the vacuum chamber 22 is connected to the intake manifold 2 via the check valve 32, and the solenoid of the solenoid valve 33 is energized in step 85 of FIG. 11, the vacuum chamber 22 is caused to be open to the atmosphere. The solenoid of the solenoid valve 33 is controlled by the output signal of the vacuum switch 90 and, when the absolute pressure P in the intake manifold 2 exceeds the predetermined pressure $P_0$ (=660 mmHgabs), the solenoid of the solenoid valve 33 is energized to cause the vacuum chamber 22 to be open to the atmosphere. In the actuator 70, the spring force of the compression spring 74 is determined so that, when the absolute pressure in the vacuum chamber 72 exceeds the predetermined pressure $P_0$, the diaphragm 71 moves towards the atmospheric pressure chamber 73 to open the flow path control valve 66.

In this embodiment, when the absolute pressure is lower than the predetermined pressure $P_0$, since the vacuum chamber 22 of the actuator 20 is connected to the intake manifold 2 via the check valve 32, the interior of the vacuum chamber 22 is maintained at a maximum vacuum produced in the intake manifold 2, and the valve body 19 closes the valve port 18. In addition, at this time, the flow path control valve 66 closes the bypass passage 65 (FIG. 2). When the absolute pressure in the intake manifold 2 becomes larger than the predetermined pressure $P_0$, the flow path control valve 66 opens the bypass passage 65 and, at this time, if the engine speed N is lower than Nx or higher than Ny, since the vacuum chamber 22 of the actuator 20 is open to the atmosphere, the valve body 19 opens the valve port 18. However, where the vacuum tank 31 is removed, there is a danger that the valve body 19 will not close the valve port 18 when the absolute pressure in the intake manifold 2 exceeds the predetermined pressure $P_0$ and when the engine speed N is between Nx and Ny. That is, if the throttle valve 41 is open to the maximum extent and, at this time, the engine speed N is lower than Nx, the vacuum chamber 22 opens to the atmosphere, as mentioned above, and the valve body 19 opens the valve port 18. If the engine speed N exceeds Nx when the throttle valve 41 remains open to the maximum extent, the solenoid of the solenoid valve 33 is deenergized and the vacuum chamber 22 is connected to the intake manifold 2 via the check valve 32. However, at this time, since the throttle valve 41 is opened to the maximum extent, vacuum in the intake manifold 2 is extremely small, and the valve body 19 continues to close the valve port 18. Consequently, where the vacuum tank 31 is removed, it is preferable that the air pulsation control valve 17 be caused to open when the absolute pressure in the intake manifold 2 exceeds the predetermined pressure $P_0$ and when the engine speed N exceeds the predetermined speed Ny, as illustrated in FIG. 6(d). In addition, in the embodiment shown in FIG. 10, the spring force of the compression spring 74 of the actuator 70 may be determined so that the flow path control valve 66 opens the bypass passage 65 (FIG. 2) when the absolute pressure in the intake manifold 2 exceeds a predetermined pressure $P_p$ which is smaller than $P_0$ in FIG. 6(d).

According to the present invention, since the flow path control valve closes the bypass passage when the engine is operating under a light load, it is possible to create a strong swirl motion in the combustion chamber. Contrary to this, where the engine is operating under a heavy load, when the flow path control valve opens the bypass passage to a maximum extent, and the flow resistance of the intake port becomes small, the volumetric efficiency is increased due to the air pulsation caused by the opening and closing control of the air pulsation control valve. As a result of this, when the engine is operating under a heavy load, it is possible to obtain a high volumetric efficiency. Here, since the opening and closing control of the air pulsation control valve is started simultaneously when the flow path control valve opens the bypass passage, or since the opening and closing control of the air pulsation control valve is carried out when the flow path control valve is open to a maximum extent, it is possible to assuredly increase the volumetric efficiency.

While the present invention has been described with reference to specific embodiments chosen for purposes of illustration, it should be apparent that numerous modifications could be made thereto by those skilled in the art without departing from the basic concept and scope of the invention.

We claim:

1. An air intake device of an internal combustion engine having an air cleaner, a cylinder head, a combustion chamber and an intake valve, said device comprising:
    a main air intake passage interconnecting the air cleaner to the combustion chamber and containing a throttle valve therein;
    an auxiliary air intake passage having a first end and a second end which are connected to the air cleaner and said main air intake passage, respectively, said auxiliary air intake passage having an equivalent pipe length which is substantially equal to that of said main air intake passage;
    an air pulsation control valve arranged in the second end of said auxiliary air intake passage for controlling communication between said second end of the auxiliary air intake passage and the main intake passage, said communication occurring at a location upstream of said throttle valve;
    first actuating means for actuating said air pulsation control valve in response to engine load and speed to selectively open said air pulsation control valve when the engine load exceeds a predetermined first load and the engine speed is within a predetermined first speed range and to selectively close said air pulsation control valve when the engine speed is within a predetermined second range;
    an intake port formed in the cylinder head and forming a part of said main air intake passage, said intake port having a helical portion which is formed around the intake valve and has a helix terminating portion, an inlet passage portion tangentially connected to said helical portion, and a bypass passage branched off from said inlet passage portion and connected to said helical portion at said helix terminating portion;
    a flow path control valve arranged in said bypass passage for controlling flow through the bypass passage; and
    second actuating means for actuating said flow path control valve in response to the engine load to open said flow path control valve when the engine load exceeds a predetermined second load not larger than said predetermined first load and to close said flow path control valve when the engine load is lower than said predetermined second load.

2. An air intake device according to claim 1, wherein said predetermined first load is higher than said predetermined second load.

3. An air intake device according to claim 1, further comprising a single fuel injector arranged in said main air intake passage upstream of said throttle valve and downstream of the second end of said auxiliary air intake passage.

4. An air intake device according to claim 1, wherein said auxiliary intake passage comprises a tank which has a fixed volume.

5. An air intake device according to claim 1, wherein said second speed range is an intermediate speed range, and said first speed range comprises a low range of the engine speed which is lower than the engine speed in said intermediate speed range, and a high range of the engine speed which is higher than the engine speed in said intermediate speed range.

6. An air intake device according to claim 1, wherein said first speed range is a high speed range, and said second speed range is a low range of the engine speed which is lower than the engine speed in said high speed range.

7. An air intake device according to claim 1, wherein said second actuating means comprises a diaphragm connected to said flow path control valve, a vacuum chamber having one wall defined by said diaphragm and directly connected to said main air intake passage, and a compression spring arranged in said vacuum chamber for biasing said diaphragm.

8. An air intake device according to claim 1, wherein said intake port has a separating wall projecting downward from an upper wall of said intake port and extending beyond an valve stem of said intake valve from said inlet passage portion, said separating wall defining said helical portion and said bypass passage.

9. An air intake device according to claim 8, wherein said separating wall extends downward to a point halfway between the upper wall and a bottom wall of said intake port.

10. An air intake device according to claim 8, wherein said bypass passage has a substantially uniform width.

11. An air intake device according to claim 8, wherein said separating wall extends to a position near a circumferential wall of said helical portion and forms a narrow passage portion therebetween.

12. An air intake device according to claim 11, wherein the distance between said separating wall and a side wall of said inlet passage portion, which faces said separating wall, is gradually reduced towards said narrow passage portion.

13. An air intake device according to claim 1, wherein said second actuating means comprises a diaphragm connected to said flow path control valve and defining one wall of a vacuum chamber, and a solenoid valve selectively connecting said vacuum chamber to one of a vacuum source and atmosphere in response to the engine load.

14. An air intake device according to claim 13, wherein said second actuating means comprises an engine load sensor and an engine speed sensor, said solenoid valve being actuated in response to output signals of said engine load sensor and said engine speed sensor for connecting said vacuum chamber to the atmosphere when the engine load exceeds said predetermined second load and when the engine speed exceeds a predetermined third speed and for connecting said vacuum chamber to said vacuum source when the engine load is lower than said predetermined second load and when the engine speed is lower than said predetermined third speed.

15. An air intake device according to claim 13, wherein said vacuum source is said main air intake passage, and said second actuating means comprises a conduit interconnecting said vacuum chamber and said main air intake passage, a vacuum tank arranged in said conduit, and a check valve arranged in said conduit between said vacuum tank and said main air intake passage and permitting air flow only from said vacuum tank to said main air intake passage, said solenoid valve being arranged in said conduit located between said vacuum chamber and aaid vacuum tank.

16. An air intake device according to claim 13, wherein said second actuating means comprises an engine load sensor, and said solenoid valve is actuated in response to an output signal of said engine load sensor for connecting said vacuum chamber to the atmosphere when the engine load exceeds said predetermined second load and for connecting said vacuum chamber to said vacuum source when the engine load is lower than said predetermined second load.

17. An air intake device according to claim 16, wherein said engine load sensor comprises a throttle switch which produces an output signal indicating that the degree of opening of a throttle valve arranged in said main air intake passage exceeds a predetermined degree.

18. An air intake device according to claim 16, wherein said engine load sensor comprises a vacuum switch arranged in said main air intake passage and producing an output signal which indicates that the absolute pressure in said main air intake passage exceeds a predetermined pressure.

19. An air intake device according to claim 16, wherein said engine load sensor comprises an accelerator switch which produces an output signal indicating that the depression of an accelerator pedal exceeds a predetermined depression.

20. An air intake device according to claim 1, wherein said first actuating means comprises a diaphragm connected to said air pulsation control valve and defining one wall of a vacuum chamber, and a solenoid valve selectively connecting said vacuum chamber to one of a vacuum source and atmosphere in response to the engine speed.

21. An air intake device according to claim 20, wherein said first actuating means further comprises an engine speed sensor, and said solenoid valve is actuated in response to an output signal of said engine speed sensor for connecting said vacuum chamber to said vacuum source when the engine speed is in said first speed range and for connecting said vacuum chamber to the atmosphere when the engine speed is in said second speed range.

22. An air intake device according to claim 20, wherein said vacuum source is said main air intake passage, and said first actuating means comprises a conduit interconnecting said vacuum chamber and said main air intake passage, a vacuum tank arranged in said conduit, and a check valve arranged in said conduit between said vacuum tank and said main air intake passage and permitting only air flow from said vacuum tank to said main air intake passage, said solenoid valve being arranged in said conduit located between said vacuum chamber and said vacuum tank.

23. An air intake device according to claim 20, wherein said first actuating means further comprises an engine speed sensor, and said solenoid valve is actuated in response to an output signal of said engine speed sensor for connecting said vacuum chamber to the atmosphere when the engine speed is in said first speed range and for connecting said vacuum chamber to said vacuum source when the engine speed is in said second speed range.

24. An air intake device according to claim 20, wherein said vacuum source is said main air intake passage, and said actuating means comprises a conduit interconnecting said vacuum chamber and said main air intake passage, and a check valve arranged in said conduit and permitting only air flow from said vacuum chamber to said main air intake passage, said solenoid valve being arranged in said conduit located between said vacuum chamber and said check valve.

25. An air intake device according to claim 20, wherein said first actuating means further comprises an engine speed sensor and an engine load sensor, said solenoid valve being actuated in response to output signals of said engine speed sensor and said engine load sensor for connecting said vacuum chamber to the atmosphere when the engine speed is in said first speed range and when the engine load exceeds said predetermined first load and for connecting said vacuum chamber to said vacuum source when the engine speed is in said second speed range or when the engine load is lower than said predetermined first load.

26. An air intake device according to claim 25, wherein said engine load sensor comprises vacuum switch arranged in said main air intake passage and producing an output signal which indicates that the absolute pressure in said main air intake passage exceeds a predetermined pressure.

27. An air intake device according to claim 20, wherein said first actuating means further comprises an engine speed sensor and an engine load sensor, said solenoid valve being actuated in response to output signals of said engine load speed sensor and said engine load sensor for connecting said vacuum chamber to said vacuum source when the engine speed is in said first speed range and when the engine load exceeds said predetermined first load and for connecting said vacuum chamber to the atmosphere when the engine speed is in said second speed range.

28. An air intake device according to claim 27, wherein said engine load sensor comprises a throttle switch which produces an output signal indicating that the degree of opening of a throttle valve arranged in said main air intake passage exceeds a predetermined degree.

29. An air intake device according to claim 27, wherein said engine load sensor comprises a vacuum switch arranged in said main air intake passage and producing an output signal which indicates that the absolute pressure in said main air intake passage exceeds a predetermined pressure.

30. An air intake device according to claim 27, wherein said engine load sensor comprises an accelerator switch which produces an output signal indicating that the depression of an accelerator pedal exceeds a predetermined depression.

* * * * *

UNITED STATES PATENT AND TRADEMARK OFFICE
CERTIFICATE OF CORRECTION

PATENT NO. : 4,574,748
DATED : March 11, 1986
INVENTOR(S) : Tokuta Inoue, et al.

It is certified that error appears in the above-identified patent and that said Letters Patent is hereby corrected as shown below:

Column 12, line 12, change "auxiliary intake" to --auxiliary air intake--.

Column 12, line 36, change "an valve" to -- a valve--.

Column 14, line 44, change "engine load speed" to --engine speed--.

Signed and Sealed this

Second Day of September 1986

[SEAL]

Attest:

Attesting Officer

DONALD J. QUIGG

Commissioner of Patents and Trademarks